US007144944B2

(12) United States Patent
Murase et al.

(10) Patent No.: US 7,144,944 B2
(45) Date of Patent: Dec. 5, 2006

(54) COATING COMPOSITION FOR INK-JET RECORDING MEDIUM AND INK-JET RECORDING MEDIUM

(75) Inventors: Naokazu Murase, Shizuoka (JP); Masakatsu Yamamoto, Shizuoka (JP)

(73) Assignee: Gelanese International Corporation, Dallas, TX (US)

( * ) Notice: Subject to any disclaimer, the term of this patent is extended or adjusted under 35 U.S.C. 154(b) by 42 days.

(21) Appl. No.: 10/471,929

(22) PCT Filed: Mar. 18, 2002

(86) PCT No.: PCT/JP02/02558

§ 371 (c)(1), (2), (4) Date: Sep. 16, 2003

(87) PCT Pub. No.: WO02/074549

PCT Pub. Date: Sep. 26, 2002

(65) Prior Publication Data

US 2004/0077781 A1 Apr. 22, 2004

(30) Foreign Application Priority Data

Mar. 19, 2001 (JP) ............................ 2001-079186

(51) Int. Cl.
*C08K 3/36* (2006.01)

(52) U.S. Cl. ...................................... 524/501; 523/201

(58) Field of Classification Search ............ 428/32.15, 428/32.23, 32.38
See application file for complete search history.

(56) References Cited

U.S. PATENT DOCUMENTS

| | | | | |
|---|---|---|---|---|
| 4,200,563 | A | 4/1980 | Komiya | 524/817 |
| 5,670,242 | A | 9/1997 | Asano et al. | 428/212 |
| 6,165,606 | A | 12/2000 | Kasahara et al. | 428/323 |
| 6,368,707 | B1 | 4/2002 | Komiya et al. | 428/349 |
| 6,511,736 | B1 | 1/2003 | Asano et al. | 428/195 |
| 6,517,941 | B1 | 2/2003 | Murase | 428/412 |
| 7,001,949 | B1 * | 2/2006 | Fasano et al. | 525/70 |
| 2003/0088014 | A1 * | 5/2003 | Edwards et al. | 524/523 |

FOREIGN PATENT DOCUMENTS

| | | |
|---|---|---|
| EP | 0 464 454 | 1/1992 |
| EP | 0 472 837 | 3/1992 |
| EP | 1 048 479 | 2/2000 |
| EP | 1 114 734 | 7/2001 |
| JP | 49-040388 | 4/1974 |
| JP | 49-046291 | 12/1974 |
| JP | 50-098484 | 8/1975 |
| JP | 52-134658 | 11/1977 |
| JP | 53-126093 | 11/1978 |
| JP | 54-144317 | 11/1979 |
| JP | 55-115419 | 9/1980 |
| JP | 56-028208 | 3/1981 |
| JP | 58-203960 | 11/1983 |
| JP | 62-034947 | 2/1987 |
| JP | 62-104802 | 5/1987 |
| JP | 62-278081 | 12/1987 |
| JP | 62278081 A | * 12/1987 |
| JP | 04-050204 | 2/1992 |
| JP | 04-053802 | 2/1992 |
| JP | 05-221113 | 8/1993 |
| JP | 07-149038 | 6/1995 |
| JP | 09-169806 | 6/1997 |
| JP | 10-046117 | 2/1998 |
| JP | 10-195276 | 7/1998 |
| JP | 10195276 A | * 7/1998 |
| JP | 10-217601 | 8/1998 |
| JP | 10-237142 | 9/1998 |
| JP | 2000-118125 | 4/2000 |
| JP | 2000-211248 | 8/2000 |
| JP | 2000-238419 | 9/2000 |
| JP | 2000-313847 | 11/2000 |
| JP | 2000-318306 | 11/2000 |
| JP | 2000-318309 | 11/2000 |
| JP | 2000313847 A | * 11/2000 |
| JP | 2003-003037 | 1/2003 |
| WO | WO 00/23533 | 4/2000 |
| WO | WO 00/25533 | 4/2000 |
| WO | WO0074945 A1 | * 12/2000 |

OTHER PUBLICATIONS

Derwent machine-assisted translation of JP 2000 313847A.*
Derwent machine-assisted translation of JP 10-195276 A.*
JPO abstract of JP 2001-162925A.*
JPO abstract of JP 2001-322349A.*
JPO abstract of JP 2000-247020A.*
JPO abstract of JP 10-309865A.*
USPTO obtained translation of JP 62-278081 A.*
English abstract for publication No. JP 49-040388, Apr. 15, 1974.
English abstract for publication No. JP 49-046291, Dec. 9, 1974.

(Continued)

*Primary Examiner*—Matthew A. Thexton
(74) *Attorney, Agent, or Firm*—Michael W. Ferrell

(57) ABSTRACT

The present invention relates to a coating composition for a recording medium useful in ink jet printing of photographic images to provide a high gloss finish. The coating composition for an ink jet recording medium comprises colloidal silica and a synthetic resin emulsion having two or more glass transition points. The synthetic resin emulsion is obtained by emulsion-polymerizing, simultaneously or separately, (A) a radical-polymerizable unsaturated monomer having a silyl group and (B) another radical-polymerizable unsaturated monomer which is copolymerizable unsaturated monomer which is copolymerizable with (A), in the presence of a radical polymerizable surfactant.

15 Claims, No Drawings

OTHER PUBLICATIONS

English abstract for publication No. JP 50-098484, Aug. 5, 1975.
English abstract for publication No. JP 52-134658, Nov. 11, 1977.
English abstract for publication No. JP 54-144317, Nov. 10, 1979.
English abstract for publication No. JP 55-115419, Sep. 5, 1980.
English abstract for publication No. JP 56-028208, Mar. 19, 1981.
English abstract for publication No. JP 58-203960, Nov. 28, 1983.
English abstract for publication No. JP 62-034947, Feb. 14, 1987.
English abstract for publication No. JP 62-104802, May 15, 1987.
English abstract for publication No. JP 09-169806, Jun. 30, 1997.
English abstract for publication No. JP 10-237142, Sep. 8, 1998.
English abstract for publication No. JP 2000-238419, Sep. 5, 2000.
English abstract for publication No. JP 2000-318309, Nov. 21, 2000.
English abstract for publication No. JP 2003-003037, Jan. 8, 2003.
English abstract for publication No. JP 62-278081, Dec. 2, 1987.
English abstract for publication No. JP 05-221113, Aug. 31, 1993.
English abstract for publication No. JP 07-149038, Jun. 13, 1995.
English abstract for publication No. JP 10-195276, Jul. 28, 1998.
English abstract for publication No. JP 10-217601, Aug. 18, 1998.
English abstract for publication No. JP 2000-118125, Apr. 25, 2000.
English abstract for publication No. JP 2000-211248, Aug. 2, 2000.
English abstract for publication No. JP 2000-313847, Nov. 14, 2000.
English abstract for publication No. JP 2000-318306, Nov. 21, 2000.

* cited by examiner

COATING COMPOSITION FOR INK-JET RECORDING MEDIUM AND INK-JET RECORDING MEDIUM

This application is based on JP 201-079186, the priority of which is hereby claimed under 35 U.S.C. § 119. A certified copy of the priority document was submitted on Dec. 29, 2005.

TECHNICAL FIELD OF PERTINENT TO THE INVENTION

The present invention relates to a coating composition for a recording medium used in ink jet printing for photographic images having high gloss, more particularly, to a coating composition used in a cast layer formed for imparting gloss on an ink fixation layer. The present invention also relates to an ink jet recording medium coated with such a coating composition. An ink jet recording medium coated with the composition of the present invention is excellent in its high gloss, weather resistance, a property of following a change of stress caused by bending, and a high ink receiving property.

PRIOR ART

Printing by an ink jet printer is showing a rapid growth recently since highly precise images can be enjoyed easily. As the substrate for this ink jet printing, gloss paper and non-gloss paper are usually used, and various technological innovations are being made day by day on such paper and many patents have been filed with respect to those technologies. Regarding the image formation and fixation mechanism of an ink jet recording medium, it is general that anionic ink is printed on a substrate containing a cationic chemical, pigment and the like, and the anionic component and the cationic component are aggregated to fix the ink. In the case of gloss paper, it is mainly observed that a gloss layer applied on an ink fixation layer containing a cationic component has minute pores and cracks, and by permeation of ink, the lower ink fixation layer and ink mutually act to cause image formation and fixation.

Japanese Patent Application Laid-Open (JP-A) No. Hei-7-149038/1995 suggests that a paint containing a pigment such as colloidal silica and the like is applied on a polymer having a glass transition point (Tg) of 40° C. or more obtained by polymerizing monomers having an ethylenic unsaturated bond, and surface gloss treatment is performed by cast coating at temperatures of the glass transition point or lower under the condition causing no complete film formation of the polymer, and a layer under condition of insufficient film formation is formed on the surface of paper while maintaining its gloss, thus permeation of ink is promoted and ink is transtered to the lower ink fixation layer. However, in this case, the glass transition point is higher than room temperature (40° C. or higher) and poor film formation is intentionally caused; therefore, the gloss layer is very fragile and when ink jet paper is rounded or folded, many cracks are easily formed on the gloss layer, and other problems are observed.

In JP-A No. Hei-10-217601/1998, a water-soluble resin which has a relatively high film-forming-property is used as an adhesive and a large amount of pigments are mixed to deteriorate film formation to thereby form an ink jet gloss layer; however, such water-soluble resin has problems in its poor water resistance, difficulty in freely changing the degree of Tg which reduces the freedom of designing, like the case of monomer having an ethylenic unsaturated bond, and low viscosity which is not suitable for paint preparation having high concentration, and the like.

PROBLEMS TO BE SOLVED BY THIS INVENTION

There has been a desire for a coating composition capable of imparting further improvement in gloss, improvement in weather resistance and a sufficient property to follow the change of stress caused by bending or folding, which had been insufficient in the prior art, while maintaining a quick ink permeability into an ink receiving layer of cast layer coating agents as in the prior art level.

MEANS FOR SOLVING THE PROBLEMS

It has been found that, according to the present invention, the above-mentioned problems can be solved by use, in a gloss layer, of a composition comprising colloidal silica and a synthetic resin emulsion having two or more different glass transition points obtained by emulsion-polymerizing simultaneously or seperately (A) a radical-polymerizable unsaturated monomer having a silyl group and (B) another radical-polymerizable unsaturated monomer which is copolymerizable with (A), in the presence of a radical-polymerizable surfactant. Namely, by the use of the radical polymerizable surfactant in emulsion polymerization, the scratch resistance of the surface of a film is improved by the copolymerization of the radical-polymerizable unsaturated monomer having a silyl group (A) without causing bleeding-out of the surfactant on the surface of a film and without adversely affecting ink permeability. Further, by the use of the synthetic resin component having high glass transition point liable to form a discontinuous film, high ink permeability can be manifested; by the use of the synthetic resin component having low Tg forming a uniform film, gloss can be improved, and a property to follow the change in stress caused by bending or folding can be improved. In addition, the fragility of a film can be improved. Further, by the presence of colloidal silica, ink receiving property can be improved while maintaining the transparency of a gloss layer.

In general, a synthetic resin obtained by polymerizing a monomer having a radical-polymerizable unsaturated bond has a Tg which can be freely designed and the temperature can be optionally modified, and by conducting a polymerization reaction under various conditions, a synthetic resin emulsion showing a Tg curve having a plurality of inflection points can be obtained.

MODES CARRYING OUT THE INVENTION

The present invention relates to a coating composition for ink jet recording medium comprising colloidal silica and a synthetic resin emulsion having two or more different glass transition points (Tg) obtained by emulsion-polymerizing (A) a radical-polymerizable unsaturated monomer having a silyl group and (B) another radical-polymerizable unsaturated monomer which is copolymerzable with (A), in the presence of a radical-polymerizable surfactant, and to an ink jet recording medium coated with such a coating composition for ink jet recording medium.

The synthetic resin emulsion constituting the coating composition of the present invention is obtained by simultaneously or separately emulsion-polymerizing (A) a radical-polymerizable unsaturated monomer having a silyl group and (b) which is another radical-polymerizable unsaturated monomer copolymerizable with (A), in the presence of a radical polymerizable surfactant. Particularly, in the present invention, for producing a synthetic resin having two or more different glass transition points, it is necessary to use means for mixing two or more types of emulsion particles which have been emulsion-polymerized separately, and having different glass transition points means for using multi-stage polymerization in which the monomer composition during polymerization is gradually change, or means for using so-called power-feed polymerization in which the monomer composition during polymerization is changed at any time.

In the present invention, it is preferable to mix emulsion particles obtained by separate emulsion-polymerization or to use an emulsion produced by multi-stage polymerization since the required physical properties can be manifested in good balance.

Components constituting the composition of the present invention will be described hereinbelow.

<Monomer Components>

(A) Radical-Polymerizable Unsaturated Monomer Having a Silyl Group

The radical-polymerizable unsaturated monomer having a silyl group (A) of the present invention not only improves the scratch resistance of the surface of a film owing to the fact the silyl group is hydrolyzed to form a cross-linked structure, but also is expected to exert an effect of coupling an inorganic component such as silicon and the like with the polymer, and in the present invention where colloidal silica is used, a polymer and colloidal silica are chemically bonded to form a film in which both features of an inorganic material and an organic material are combined together. Specifically, a soft film having high water resistance and heat resistance is formed.

The radical polymerizable unsaturated monomer having a silyl group (A) used in the present invention is a compound represented by the following general formula (1) or the general formula (2) having a radical-polymerizable unsaturated bond.

$$R—Si(X)_3 \quad (1)$$

$$R—Si(R')(X)_2 \quad (2)$$

In the above-mentioned general formulae (1) and (2), R represents an organic group having a vinyl group, (meth) acryloxy group, epoxy group, mercapto group, amino group, isocyanate group and the like. R' represents a lower alkyl group having 1 to 3 carbon atoms. X represent a methoxy group or ethoxy group having a radical-polymerizable unsaturated bond.

Examples of a monomer having an alkoxysilyl group on the side chain include vinylorganoalkoxysilanes such as vinyltrimethoxysilane, vinylmethyldimethoxysilane, vinyldimethylmethoxysilane, vinyltriethoxysilane, vinyl(2-methoxyethoxy)silane, vinyltriacetoxysilane and the like, epoxyorganoalkoxysilanes such as γ-methacryloxypropyltrimethoxysilane, γ-glycidoxypropyltrimethoxysilane, γ-glycidoxypropylmethyldimethoxysilane, 3,4-epoxycyclohexylethyltrimethoxysilane, 3,4-epoxycyclohexylethyldimethoxysilane and the like, mercaptoorganoalkoxysilanes such as γ-mercaptopropyltrimethoxysilane and the like, γ-methacryloxypropyltrimethoxysilane, γ-methacryloxypropyltriethoxysilane and the like.

In the present invention, these unsaturated monomers (A) may be used either alone or in a combination of two or more of them. Of these monomers, it is preferable to use, particularly vinyltriethoxysilane and 3-methacryloxypropyltriethoxysilane in the present invention, in view of the polymerizability.

The amount of the use of the above-mentioned radical polymerizable unsaturated monomer having a silyl group (A) is suitably from 0.1 to 15 parts by weight, preferably from 0.5 to 10 parts by weight based on total radical polymerizable unsaturated monomers used.

When the amount of the use of the above-mentioned radical polymerizable unsaturated monomer having a silyl group is less than 0.1% by weight, complexation with colloidal silica bicomes insufficient, and water resistance may decrease, and when the amount is over 15% by weight, instability of polymerization, generation of many aggregates, increase in viscosity, and the like can occur.

(B) Copolymerizable Other Radical-polymerizable Unsaturated Monomer

As another radical-polymerizable unsaturated monomer (B) which is copolymerizable with (A) used in the present invention, those which can be used in usual emulsion-polymerization can be used without particular limitation.

These monomers are composed of a main monomer which is a main component of a synthetic resin(B-1), and a functional monomer which modifies a synthetic resin to impart further functions (B-2).

Regarding the main monomer (B-1), examples of the monomer which is a main component of the synthetic resin include alkyl (meth)acrylates, cycloalkyl (meth)acrylates, olefins, vinyl esters, aromatic vinyl compounds and the like.

More specifically, as the alkyl (meth)acrylates, cycloalkyl (meth)acrylates, particularly alkyl (meth) acrylates those having in the alkyl group 1 to 12 carbon atoms, such as methyl, ethyl, n-butyl, t-butyl, propyl, 2-ethylhexyl, octyl and the like, and cyclohexyl acrylate, cyclohexyl methacrylate and the like.

As the olefin, ethylene and propylene are listed, and in addition, as the vinyl ester, vinyl acetate, vinyl esters of branched carboxylic acids, vinyl laurate, and the like are listed; and as the aromatic vinyl compound, styrene, α-methylstyrene and the like are listed.

As the functional monomer modifying a synthetic resin (B-2) to impart various functions such as storage stability, water resistance, chemical resistance, weather resistance, adhesion and the like, there are listed, for example, ethylenically unsaturated carboxylic acids which improve storage stability and adhesion (B-2a), monomers having two or more radical-polymerizable unsaturated bonds which improve water resistance, weather resistance, chemical resistance, adhesion and the like (B-2b), monomers having an amide group, nitrile group, hydroxyl group, glycidyl group, methylol group, carbonyl group, quaternary ammonium salt, ethylene oxide chain or chlorine on the side chain, and the like (B-2-others).

As the ethylenically unsaturated carboxylic acid (B-2a), acrylic acid, methacrylic acid, crotonic acid, maleic acid and the like are listed.

As the monomer having two or more radical-polymerizable unsaturated bonds (B-2b), there are listed divinyl compounds, di(meth)acrylate compounds, tri(meth)acrylate compounds, tetra(meth)acrylate compounds, diallyl compounds, triallyl compounds, tetraallyl compounds and the like. More specifically, divinylbenzene, divinyl adipate, ethylene glycol di(meth)acrylate, diethylene glycol di(meth)

acrylate, triethylene glycol di(meth)acrylate, polyethylene glycol di(meth)acrylate, polypropylene glycol di(meth)acrylate, neopentyl glycol di(meth)acrylate, 1,3-butylene glycol di(meth)acrylate, 1,3-butyl di(meth)acrylate, trimethylolethane tri(meth)acrylate, trimethylolpropane tri(meth)acrylate, dipentaerythritol tri(meth)acrylate, diallyl phthalate, triallyl dicyanurate, tetraallyloxyethane and the like.

Regarding other functional monomers (B-2-others), listed as the monomer having a hydroxyl group are hydroxyethyl methacrylate, hydroxyethyl acrylate, hydroxypropyl methacrylate, hydroxypropyl acrylate, hydroxybutyl methacrylate, hydroxybutyl acrylate and the like; listed as the monomer having an amide group are acrylamide, methacrylamide and the like; listed as the monomer having a nitrile group are acrylonitrile and the like; listed as the monomer having chlorine on the side chain are vinyl chloride, vinylidene chloride and the like, listed as the monomer having a glycidyl group are glycidyl methacrylate, glycidyl acrylate; listed as the monomer having a methylol group are N-methylolacrylamide and the like; and listed as the monomer having a carbonyl group are acetacetoxyethyl methacrylate and the like.

In the present invention, as the main monomer (B-1), those preferred are alkyl (meth) acrylates, cycoloalkyl (meth) acrylates, styrene, and vinyl esters of branched carboxylic acids. These may be used alone; however, they are used preferably in a combination of two or more of them. For example, a combination of two or more alkyl (meth) acrylates and styrene, a combination of two or more alkyl meth) acrylates, and a combination of vinyl esters of branched carboxylic acids and alkyl methacrylates are preferable from the viewpoint of water resistance, weather resistance, polymerization stability and the like. The use of two or more alkyl (meth) acrylates in combination is convenient for control of glass transition point and for improvement of various properties.

Further, as the functional monomer (B-2), ethylenically unsaturated carboxylic acids are preferable, and this ethylenically unsaturated carboxylic acid tends to be oriented over the surface of the synthetic resin emulsion particle, and by partially neutralizing its hydroxyl group, an electric double layer is formed while contributing to the dispersion stability of the emulsion particles.

As the above-mentioned component (B), at least one of the above-listed components may be used. However, it is preferable to use at least one or more selected from alkyl (meth)acrylates, cycloalkyl (meth)acrylates, styrene and vinyl esters of branched carboxylic acids in combination with at least one or more selected from ethylenically unsaturated carboxylic acids as the functional monomer.

<Other Components Used in Polymerization>

The emulsion polymerization according to the present invention may be conducted in an aqueous medium under the addition of other known components such as surfactants and polymerization initiators. Further, protective colloid, chain transfer agents, pH controlling agents, ultraviolet absorbers, photooxidation inhabitors and the like may be used if desired.

A surfactant functions as an emulsifier in emulsion polymerization, and specifically, usual anionic, cationic or nonionic surfactants are listed. In the present invention, radical-polymerizable surfactants having one radical-polymerizable unsaturated group in the molecule are particularly used.

The radical polymerizable surfactant is chemically bonded to the polymer component due to the presence of its polymerizable unsaturated bond, and when film is formed, it does not bleed out as a liberating surfactant on the surface of a film. Therefore, bleeding does not occur in ink jet printing and ink permeates quickly into the fixation layer. When the radical-polymerizable surfactant is not used, liberated surfactant bleeds out on the surface of a film, and ink bleeding occurs upon printing.

The radical-polymerizable surfactant can be appropriately selected from known substances. For example, anionic and nonionic surfactants and the like are listed, and specific examples thereof include the following compounds 1) to 16).

Compound 1

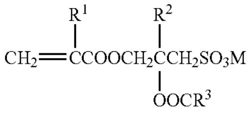

$R^1$, $R^2$: H, $CH_3$
$R^3$: $C_{7-21}$ alkyl, alkenyl group
M: alkali metal, ammonium group
(see, JP-A No. Sho-54-144317/1979)

Compound 2

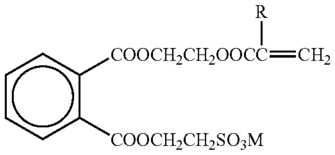

R: H, $CH_3$
M: alkali metal, ammonium group, amine
(see, JP-A No. Sho-55-115419/1980)

Compound 3

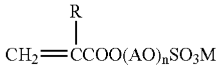

R: H, $CH_3$, A: alkylene group,
n: 2 an integer of 2 or more
M: mono-valent, di-valent anion
(see, JP-A No. Sho-62-34947/1987)

Compound 4

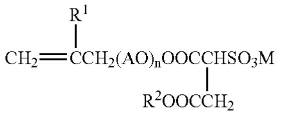

$R^1$: H, $CH_3$
$R^2$: unsubstituted or substituted hydrocarbon group, and the like
A: $C_{2-4}$ alkylene group, substituted alkylene group
n: 0 or a positive integer
(see, JP-B No. Sho-49-46291/1974)

Compound 5

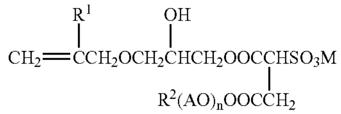

$R^1$: H, $CH_3$
$R^2$: unsubstituted or substituted hydrocarbon group, amino group and the like
A: $C_{2-4}$ alkylene group, n: 0 to 100
M: mono-valent, di-valent anion
(see, JP-A No. Sho-58-203960/1983)

-continued

Compound 6

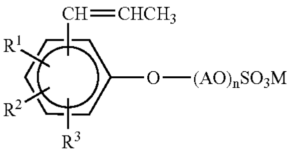

$R^1$: $CH_{6-18}$ alkyl group, and the like
$R^2$: H, $CH_{6-18}$ alkyl group, and the like
$R^3$: H, propenyl group
A: $CH_{2-4}$ alkylene group, substituted alkylene group
M: alkali metal, and the like
n: 1 to 200
(see, JP-A No. Hei-4-53802/1992)

Compound 7

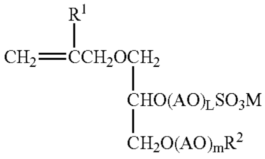

$R^1$: H, $CH_3$
$R^2$: $CH_{8-24}$ hydrocarbon group, and the like
A: $CH_{2-4}$ alkylene group
M: H, alkali metal, alkaline earth metal, ammonium group, and the like
L: 0 to 20
m: 0 to 50
(see, JP-A No. Sho-62-104802/1987)

Compound 8

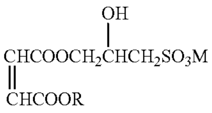

R: $CH_{8-23}$ hydrocarbon group
M: alkali metal, ammonium group
(see, JP-A No. Sho-49-40388/1974)

Compound 9

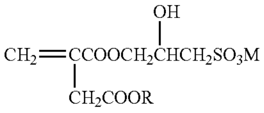

R: $CH_{8-22}$ hydrocarbon group
M: alkali metal, ammonium group
(see, JP-A No. Sho-49-40388/1974)

Compound 10

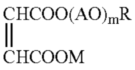

R: alkyl, alkylphenyl, A: ethylene
M: ammonium, amine, alkali metal
m: 9, 12, 14, 28 (Examples)
(see, JP-A No. Sho-52-134658/1977)

Compound 11

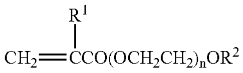

$R^1$: H, $CH_3$
$R^2$: H, $CH_3$, $—C_6H_4—(CH_2)_m—H$
n: 4 to 30
(see, JP-A No. Sho-53-126093/1978)

-continued

Compound 12

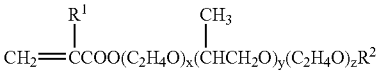

$R^1$, $R^2$: H, $CH_3$, x: 0 to 100
y: 0 to 100, z: 0 to 100
$1 \leq x + y + z \leq 100$
(see, JP-A No. Sho-56-28208/1981)

Compound 13

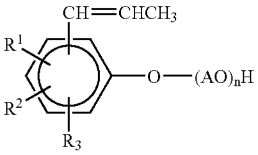

$R^1$: $C_{6-18}$ alkyl group, and the like
$R^2$: H, $CH_{6-18}$ alkyl group, and the like
$R^3$: H, propenyl group
A: $C_{2-4}$ alkylene group, substituted alkylene group
n: 1 to 200
(see, JP-A No. Hei-4-50204/1992)

Compound 14

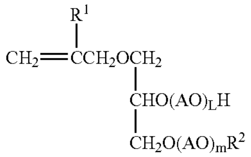

$R^1$: H, $CH_3$
$R^2$: $CH_{8-24}$ hydrocarbon group, acyl group
A: $C_{2-4}$ alkylene group
L: 0 to 100, m: 0 to 50
(see, JP-A No. Sho-62-104802/1987)

Compound 15

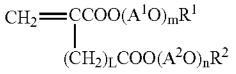

$R^1$, $R^2$: H, $C_{1-30}$ hydrocarbon group, acyl group
$A^1$, $A^2$: $C_{3-4}$ alkylene group, substituted alkylene group
L: 1, 2
m, n: 0 or a positive, integer
$m + n \geq 3$
When both of $R^1$ and $R^2$ are H,
$m, n \geq 1$
(see, JP-A No. Sho-50-98484/1975)

Compound 16

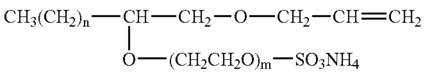

$n \geq 1$,
m: 1 to 200

Other surfactants such as anionic and nonionic surfactants having no radical-polymerizable unsaturated bond, and the like can also be used in addition to the radical-polymerizable surfactant. Namely, as the anionic surfactant, for example, sodium alkylbenzenesulfonate, sodium alkylsulfonate, sodium polyoxyethylene alkyl ether sulfonate, and the like are listed.

As the nonionic surfactant, for example, polyoxyethylene alkyl ether-type surfactants, polyoxyethylene alkyl ether-type surfactants, polyoxyethylene or polyoxypropylene glycol-type surfactants and the like are listed.

Regarding these surfactants, all amounts of them may be charged in the polymerization initiation period, or at least a part of them may be added dropwise, or they may be used as an emulsified monomer in the polymerization after being mixed with the monomer. Combination of two or more of these may be used as well. In the present invention, it is preferable to mix them with a monomer and to use the mixture as an emulsified monomer in the polymerization from the standpoint of improving polymerization stability and control of particle diameter.

The amount of use of all surfactants is from about 0.1 to 20% by weight based on all monomers. Particularly, it is essential to use a radical-polymerizable surfactant in the present invention, and the amount of use thereof is from 0.3 to 10% by weight, preferably from 0.5 to 5.0% by weight based on all monomers used.

When the use amount of use of the radical-polymerizable surfactant is less than 0.3% by weight, the reaction system may be agglomerated, or the reaction may not be completed. On the other hand, if non-radical-polymerizable surfactants are used in an excessive amount to prevent the above-mentioned defects, the surfactant is liberated on the surface of a coating layer to generate bleeding of ink. When over 10% by weight is used, the viscosity of the reaction system increases too greatly thus lowering water resistance in some cases.

The polymerization initiator is the one which is radical-decomposed by the action of heat or a reducing substance to thereby advance the addition polymerization of monomers, and listed are water-soluble or oil-soluble persulfates, peroxides, azobis compounds and the like, and examples thereof include potassium persulfate, ammonium persulfate, t-butyl hydroperoxide, hydrogen peroxide, azobisisobutyronitrile (AIBN), rongalite, sodium metabisulfite, and the like. They may be used either alone or in combination of two or more. These polymerization initiators may be used together with transition metal ions if desired, and as the transition metal ion, ferric sulfate, cupric chloride, ferric chloride and the like are preferable.

As the protective colloid, there can be used without particular limitation any known substances used in emulsion polymerization, and examples thereof include polyvinyl alcohol and derivatives thereof, cellulose ether and derivatives thereof, starch derivatives and the like, and these are used in the form of an aqueous solution.

The chain transfer agent to be used is not restricted to any particular type and may be appropriately selected from known substances, and examples thereof include alcohols such as methanol, ethanol, propanol, butanol and the like, carboxylic acids having 2 to 8 carbon atoms such as acetone, methyl ethyl ketone, cyclohexane, acetophenone, acetaldehyde, propionaldehyde, n-butylaldehyde, furfural, benzaldehyde and the like, mercaptanes such as dodecylmercaptane, laurylmercaptane, n-mercaptane, thioglycolic acid, octyl thioglycolate, thioglycerol and the like. These may be used either alone or in a combination of two or more.

As the pH controlling agent, known substances such as ammonia, sodium hydroxide, potassium hydroxide and the like are listed.

The ultraviolet absorber is not particularly restricted, and benzophenone derivatives, benzotriazole derivatives are suitably used. These include those having a radical-polymerizable unsaturated bond, that can be preferably copolymerized with the synthetic resin components.

As the photooxidation inhibitor, hindered phenol-based substances, and hindered piperidine-based substances are suitably used, and examples of the photooxidation inhibitor include, as with the ultraviolet absorber, also those having a radical-polymerizable unsaturated bond, that can be preferably used since they are copolymerized with the synthetic resin components.

According to the present invention, the characteristic feature resides in that a synthetic resin emulsion obtained by emulsion-polymerization has at least two or more glass transition points.

Regarding the glass transition point (Tg) of polymers of a synthetic resin emulsion, it is preferable that at least one point be 30° C. or lower, particularly from −50 to 30° C. and at least another point be higher than 30° C., particularly, above 30° C. to 100° C. or lower. Further preferably, at least one point be from −30 to 30° C., and at least another one point be from 50 to 90° C.

When the lower transition point is 30° C. or lower, a uniform film is obtained after drying and gloss is improved, and additionally, in actual use, a resin manifests sufficient flexibility, and the cracking of a coating layer on the surface of a recording medium can be suppressed. On the other hand, when the higher glass transition point is 30° C. or higher, microscopic cracks are formed on the coating layer, and ink is carried quickly into an ink receiving layer through the cracks, so that ink permeability is excellent. Both resin components of the present invention can impart the excellent properties simultaneously, and consequently, the resin components of the present invention can be combined further with other factors to give an extremely excellent coating composition.

Here, the glass transition point means a temperature at which a synthetic resin particle in a synthetic resin emulsion causes phase transition from a hard and fragile glass state to a soft rubbery state. The emulsion glass transition point in the present invention means that there are at least two phase transition temperatures. In order to determine the glass transition point, the presence of its inflection point can be easily confirmed by measurement using an analyzer such as a differential scanning calorimeter (DSC).

For obtaining a synthetic resin emulsion having two or more glass transition points of the present invention, it is necessary to use an emulsion mixture obtained by separately emulsion-polymerized synthetic resin emulsions, or to use a product from multi-stage polymerization in which a monomer composition in the polymerization stage is gradually changed, or to use a product from a power-feed polymerization method in which a monomer composition is changed at any time, further, to use a seed polymerization method, and the like. A film of a synthetic resin emulsion obtained by these polymerization methods shows a different behavior from that of a synthetic resin emulsion polymerized from a homogenenous monomer composition. When using a synthetic resin emulsion obtained by polymerization from a homegeneous monomeric composition, the film so obtained exhibits only intermediate physical properties compared with those obtained from the respective single monomers as the result of offsetting the particular properties of respective single polymers. This itself is useful in some applications of the synthetic resin emulsion. However, by specifying a polymerization method as in the present invention, a film having contrary physical properties existing together can be obtained. The reason for this can be assumed to be that though a formed film is homogenized in macro scale, it includes non-homogeneous parts in micro scale. In the present invention, it is preferable that separately polymerized synthetic resin emulsion particles are mixed, or a synthetic resin emulsion obtained by multi-stage polymerization be used.

When synthetic resin emulsions are used in admixture, it is preferable, for example, to mix an acrylate copolymer emulsion or styrene-acrylate copolymer emulsion having a glass transition point of 30° C. or lower with an acrylate copolymer emulsion or styrene-acrylate copolymer emulsion having a glass transition point of 50° C. or higher at the mixing ratio of 10:90 to 90:10 (parts by weight) based on non-volatile components reduction.

When the synthetic resin emulsion of the present invention is obtained by a multi-stage polymerization method, it is preferable, for example, that monomers mainly containing an acrylate of which the composition has been regulated so that the glass transition point is lower than the desired temperature are firstly emulsion-polymerized; subsequently, monomers mainly containing an acrylate of which composition has been regulated so that the glass transition point is higher than the desired temperature are emulsion-polymerized. Therefore, core-shell shaped, confetti shaped, snow man-shaped emulsion particles can be formed. In this case, the ratio of the composition having lower glass transition point to the composition having higher glass transition point is preferably from 10:90 to 90:10 (parts by weight) in terms of non-volatile components reduction.

When the amount of the resin component having lower glass transition point is 10 parts by weight or less, sufficient gloss cannot be obtained, and stress relaxation upon bending becomes insufficient. When 90 parts by weight or more, the resulting film is too uniform, and minute pores and cracks for absorbing ink are deficient, and printing aptitude deteriorates.

In the present invention, it is characteristic that colloidal silica is used together with a synthetic resin emulsion.

Colloidal silica is silica sol with ultrafine particles dispersed in water in the form of colloid, and the diameter of its primary particle is usually in the range from 5 to 100 nm.

In the present invention, any commercially available products can be used, as the above-mentioned colloidal silica, and the colloidal silica may be surface-treated with a metal ion such as meta-aluminate ion and the like, or may be mono-dispersed, or particles may be connected in the form of chain or of branch by special treatment.

Among these, those surface-treated with a metal ion such as a meta-aluminate ion and the like are preferable from the viewpoint of excellent mixing stability.

Regarding the amount of use of the colloidal silica based on a synthetic resin emulsion, the ratio of synthetic resin emulsion:colloidal silica is preferably from 10:90 to 90:10, preferably from 30:70 to 70:30 based on non-volatile components.

<Other Components Added to Coating Composition>

In the coating composition of the present invention, various pigments, dyes, coloring pigment thickening agents, pH controlling agents, surfactants, dispersing agents, defoaming agents, anti-freezing agents, releasing agents, ultraviolet absorbers, photoxidation inhibitors and the like which can be used in an aqueous coating composition can be added for modifying and improving whiteness, viscosity, flowability, mixing property, preservability, weather resistance, workability and the like, if necessary.

An ink jet recording medium according to this invention is obtained by applying the coating composition of the present invention as a gloss layer followed by drying it. In this operation, the material and structure of the substrate and the ink coated layer are not particularly restricted so far as they are generally used in an ink jet recording medium. For example, for providing gloss to a medium provided with an ink receiving ability to a substrate itself such as paper, film, cloth and the like, the gloss layer of the present invention is applied by a known coating method (comma coater, blade coater, air-knife coated and the like), the layer is dried and gloss is imparted by these treatments.

For providing ink receiving ability by coating a composition consisting of a pigment, binder, cationic substance having an ink fixing ability and the like on a substrate, an ink fixation layer is provided. In the case of paper, cloth and the like, a pigment, binder, cationic substance having an ink fixation ability, and the like are impregnated, or added in a paper making stage, so as to allow at least a part or all of them to be contained inside.

As the pigment, there are listed, for example, inorganic pigments such as zinc oxide, titanium oxide, calcium carbonate, silic acid, silicate, clay, talc, mica, calcined clay, aluminum hydroxide, barium sulfate, lithopone, silica, colloidal silica and the like; plastic pigments, processed into the form of a sphere, hollow shape, or other various forms and structures, of polystyrene, polyethylene, polypropylene, epoxy resins, acrylic resins, acryl-styrene copolymers and the like.

As the binder, synthetic and natural polymers can be used. For example, polyvinyl alcohol, denatured polyvinyl alcohol, starch and derivatives thereof, cellulose ether and derivatives, sodium polyacrylate, polyvinylpyrrolidone, acrylamide copolymer, (meth) acrylic acid copolymer, polyethylene glycol, polyvinyl acetate, polyurethane, urethan-acryl copolymer, ethylene-vinyl acetate copolymer, vinyl chloride-vinyl acetate copolymer, styrene-butadiene copolymer, styrene-butadiene-acrylic copolymer, glue, casein, soybean protein, gelatin, sodium arginate and the like.

The coating amount (cast coating amount) of the coating composition of the gloss layer in the present invention is preferably from 5 to 50 g/m$^2$ (reduced by non-volatile components) and more preferably from 7 to 35 g/m$^2$ (reduced by non-volatile components).

As the method of drying and gloss imparting after coating, drying by hot air, calendering, casting and the like are used. More specifically, when a coating composition is still wet after coating, it is preferable to set the temperature of a cast roll to 60 to 100° C. upon casting.

Thus obtained ink jet recording medium according to this invention has extremely remarkable abilities in that it has high gloss, weather resistance and a degree of follow ability to the change in stress caused by bending or folding, and also has a high ink receiving ability at the same time.

EXAMPLES

Production Example 1

In a polymerization vessel were charged 70 parts by weight of water, 0.4 parts by weight of sodium alkylallylsulfosuccinate and 0.2 parts by weight of polyoxyethylene nonylphenyl ether, and they were dissolved by stirring, and heated up to 75° C.; and into this were dropped 10 parts by weight of 4% potassium persulfate and the following emulsified monomer composition over 2 hours while advancing the polymerization reaction. After completion of dropping, the reaction was kept for aging for 1 hour to obtain a opalescent synthetic resin emulsion.

| | |
|---|---|
| Water | 50 parts by weight |
| Poyoxyethylene nonylphenyl ether | 0.2 parts by weight |
| Sodium alkylallylsulfosuccinate | 1.0 parts by weight |
| Methyl methacrylate | 30 parts by weight |
| Butyl acrylate | 70 parts by weight |
| Methacrylic acid | 3 parts by weight |
| Vinyltriethoxysilane | 5 parts by weight |

To this synthetic resin emulsion was added 2 parts by weight of a 10% ammonia aqueous solution to control pH to about 9. Regarding the glass transition point of the resulting synthetic resin emulsion particle, the inflection point was observed in the temperature region of 15° C. or lower by measurement by DSC (manufactured by Perkin Elmer).

Production Examples 2 to 8

The same procedure as in Production Example 1 was repeated except that the emulsifier in the polymerization vessel and the emulsifier in the emulsified monomer composition, the radical-polymerizable unsaturated monomer, the monomer having an alkoxysilyl group on the side chain and the like were changed. as shown in Table 1.

-continued

| | |
|---|---|
| Methacrylic acid | 3 parts by weight |
| 3-Methacryloxypropyltriethoxysilane | 2 parts by weight |

Subsequently, the following emulsified monomer composition and 13 parts by weight of 4% potassium persulfate

TABLE 1

| | Production Example | | | | | | | |
|---|---|---|---|---|---|---|---|---|
| | 1 | 2 | 3 | 4 | 5 | 6 | 7 | 8 |
| Emulsified monomer composition | | | | | | | | |
| Methyl methacrylate | 30 | 30 | 30 | 30 | 57 | 57 | 30 | 30 |
| Butyl methacrylate | 70 | 70 | — | — | 43 | 43 | 70 | — |
| Styrene | — | — | 60 | 60 | — | — | — | 60 |
| 2-ethylhexyl acrylate | — | — | 10 | 10 | — | — | — | 10 |
| Methacrylic acid | 3 | 3 | 3 | 3 | 3 | 3 | 3 | 3 |
| Vinyltriethoxysilane | 5 | 5 | 5 | 5 | — | — | 1 | 10 |
| 3-methacryloxypropyltriethoxy silane | — | — | — | — | 5 | 5 | — | — |
| Sodium alkylallylsulfosuccinate | 1.0 | — | — | — | 0.4 | 1.0 | 1.0 | 1.0 |
| Polyoxyalkylene alkylpropenylphenyl ether sulfate ester salt | — | 1.0 | — | — | — | — | — | — |
| αsulfo-ω-(1-((nonylphenoxy)methyl-2-(2-propenyloxy)ethoxy-poly (oxy-1,2-ethanediyl)ammonium salt | — | — | 1.0 | 1.0 | — | — | — | — |
| Polyoxyethylene nonylphenylether | 0.2 | 0.2 | 0.2 | — | 0.4 | 0.2 | 0.2 | 0.2 |
| Vinyl ether ethoxylate (ethylene oxide: 50 mol) | — | — | — | 1.0 | — | — | — | — |
| Emulsifier added to polymerization vessel | | | | | | | | |
| Sodium alkyallylsulfosuccinate | 2.0 | — | — | — | 0.6 | 2.0 | 2.0 | 2.0 |
| Polyoxyalkylene alkylpropenylphenyl ether sulfate ester salt | — | 2.0 | — | — | — | — | — | — |
| αsulfo-ω-(1-((nonylphenoxy)methyl-2-(2-propenyloxy)ethoxy-poly ethanediyl)ammonium salt | — | — | 2.0 | 2.0 | — | — | — | — |
| Polyoxyethylene nonylphenylether | 0.2 | 0.2 | 0.2 | — | 0.4 | 0.2 | 0.2 | 0.2 |
| Vinyl ether ethoxylate (ethylene oxide: 50 mol) | — | — | — | 1.0 | — | — | — | — |
| Temperature region (° C.) at which inflection point is observed | 1 point when 15° C. or lower | 1 point when 15° C. or lower | 1 point when 70° C. or higher | 1 point when 70° C. or higher | 1 point when 30° C. or lower | 1 point when 30° C. or lower | 1 point when 15° C. or lower | 1 point when 70° C. or higher |

Production Example 9

In a polymerization vessel were charged 50 parts by weight of water, 0.4 parts by weight of sodium alkylallylsulfosuccinate and 0.2 parts by weight of polyoxyethylene nonylphenyl ether, and they were dissolved by stirring, and heated up to 75° C.; and to this were dropped 13 parts by weight of 4% potassium persulfate and the following emulsified monomer composition over 3 hours while advancing the polymerization reaction as the first stage polymerization

| | |
|---|---|
| Water | 30 parts by weight |
| Poyoxyethylene nonylphenyl ether | 0.5 parts by weight |
| Sodium alkylallylsulfosuccinate | 1.5 parts by weight |
| Methyl methacrylate | 30 parts by weight |
| Butyl acrylate | 20 parts by weight |

were added dropwise over 3 hours, and thus polymerization in the second stage was conducted.

| | |
|---|---|
| Water | 30 parts by weight |
| Poyoxyethylene nonylphenyl ether | 0.5 parts by weight |
| Sodium alkylallylsulfosuccinate | 1.5 parts by weight |
| Styrene | 30 parts by weight |
| Methyl methacrylate | 15 parts by weight |
| 2-Ethylhexyl acrylate | 5 parts by weight |
| Methacrylic acid | 3 parts by weight |
| 3-Methacryloxypropyltriethoxysilane | 2 parts by weight |

After completion of the dropwise addition, aging was conducted for 1 hour to obtain a uniform and excellent synthetic resin emulsion. When the glass transition point of the resulted emulsion was measured by DSC, one inflection point was observed in the temperature region of 15° C. or lower, and another inflection point was observed in the temperature region of 70° C. or higher, i.e., two inflection points in total.

Production Example 10

In a polymerization vessel were charged 50 parts by weight of water, 0.4 parts by weight of sodium alkylallylsulfosuccinate and 0.2 parts by weight of polyoxyethylene nonylphenyl ether, and they were dissolved by stirring, and heated up to 75° C.; and to this were dropped 13 parts by weight of 4% potassium persulfate and the following emulsified monomer composition over 3 hours while advancing the polymerization reaction as the first stage polymerization.

| | |
|---|---|
| Water | 30 parts by weight |
| Poyoxyethylene nonylphenyl ether | 0.5 parts by weight |
| Sodium alkylallylsulfosuccinate | 1.5 parts by weight |
| Styrene | 45 parts by weight |
| Methyl methacrylate | 23 parts by weight |
| 2-ethylhexyl acrylate | 7 parts by weight |
| Methacrylic acid | 3 parts by weight |
| 3-methacryloxypropyltriethoxysilane | 2 parts by weight |

Subsequently, the following emulsified monomer and 13 parts by weight of 4% potassium persulfate were added dropwise over 3 hours to carry out the second stage polymerization.

| | |
|---|---|
| Water | 30 parts by weight |
| Poyoxyethylene nonylphenyl ether | 0.5 parts by weight |
| Sodium alkylallylsulfosuccinate | 1.5 parts by weight |
| Methyl methacrylate | 18 parts by weight |
| Butyl acrylate | 12 parts by weight |
| Methacrylic acid | 3 parts by weight |
| 3-Methacryloxypropyltriethoxysilane | 2 parts by weight |

After completion of the dropwise addition, aging was conducted for 1 hour to obtain a uniform and excellent synthetic resin emulsion. When the glass transition point of the resulted emulsion was measured by DSC, one inflection point was observed in the temperature region of 15° C. or lower, and another inflection point was observed in the temperature region of 70° C. or higher, i.e., two inflection points in total.

Comparative Production Examples 1 to 6

The same procedure as in Production Example 1 was repeated except that the emulsifier in the polymerization vessel and the emulsifier in the emulsified monomer composition, the radical polymerizable unsaturated monomer, the monomer having an alkoxysilyl group on the side chain, and the like were changed as shown in Table 2.

TABLE 2

| | Comparative Production Example | | | | | |
|---|---|---|---|---|---|---|
| | 1 | 2 | 3 | 4 | 5 | 6 |
| Emulsified monomer composition | | | | | | |
| Methyl methacrylate | 30 | 30 | 30 | 30 | 30 | 30 |
| Butyl methacrylate | 70 | 70 | 70 | — | — | — |
| Styrene | — | — | — | 60 | 60 | 60 |
| 2-ethylhexyl acrylate | — | — | — | 10 | 10 | 10 |
| Methacrylic acid | 3 | 3 | 3 | 3 | 3 | 3 |
| Vinyltriethoxysilane | — | 5 | — | — | 5 | — |
| Sodium alkylallylsulfosuccinate | — | — | 1.0 | — | — | 1.0 |
| Polyoxyethylene nonylphenyl ether | 1.0 | 1.2 | 0.2 | 1.0 | 1.2 | 0.2 |
| Emulsifier added to polymerization vessel | | | | | | |
| Sodium alkyallylsulfosuccinate | — | — | 2.0 | — | — | 2.0 |
| Polyoxyethylene nonylphenyl ether | 1.0 | 2.2 | 0.2 | 1.0 | 2.2 | 0.2 |
| Temperature (° C.) at which inflection point is observed | 1 point when 15° C. or lower | 1 point when 15° C. or lower | 1 point when 15° C. or lower | 1 point when 70° C. or higher | 1 point when 70° C. or higher | 1 point when 70° C. or higher |

Example 1

The synthetic resin emulsion obtained in Production Example 1 in an amount of 30 parts by weight in terms of non-volatile components and the synthetic resin emulsion obtained in Production Example 3 in an amount of 70 parts by weight in terms of non-volatile components were mixed. When the glass transition point of the resulted synthetic resin emulsion mixture was measured by DSC, one inflection point was observed in the temperature region of 15° C. or lower, and another inflection point was observed in the temperature region of 70° C. or higher, i.e., two inflection points in total.

To 100 parts by weight of non-volatile components of the above-mentioned synthetic resin emulsion, colloidal silica in an amount of 120 parts by weight in terms of non-volatile components was combined. Then a coating composition was prepared by further incorporating 5 parts by weight of a thickening agent and 2 parts by weight of polyethylene wax as a releasing agent.

An ink fixation layer composed of a pigment, binder and cationic substance was applied onto a paper substrate, and the above-prepared coating solution was coated on its upper layer using a bar coater, and immediately after that, it was subjected to contact under pressure with a cast drum having a mirror surface having a surface temperature of 80° C. and dried, then, released to obtain an ink jet recording paper having gloss. At this point, the cast coated amount was 10 $g/m^2$ based on terms of non-volatile components.

Examples 2 to 10

The same procedure as in Production Example 1 was repeated except that the kind and amount of the synthetic resin emulsions and the amount of colloidal silica were changed as shown in Table 3.

Evaluation

Regarding ink jet recording papers having glossiness thus obtained, white paper glossiness, printing ability and folding or bending resistance were evaluated, and the results are shown in Table 1. The details of the tests are as shown below: White paper glossiness: The gloss at 75° was measured according to JIS-P8142, and evaluated based on the following standards:

◎: 65 or more
○: 60 or more and less than 65. .

◎: Excellently printed.
○: Printed without problems.
Δ: Adjacent inks are somewhat intermixed.
×: Inks spread out flow and are mixed, no longer practical.

Folding/bending resistance: The resulted ink jet recording paper was bent to 90°, and the surface condition at this operation was visually evaluated.

○: No cracking observed
Δ: Some cracks are observed, but no practical problem.
×: Cracks are formed with crunching sound.

Bend resistant printing ability: After the folding/bending resistance test, ink jet printing (ISO/JIS-SCID JIS X9201-1995: N5) was subsequently conducted using the same ink jet printer as used in the printing ability test and its printing ability was evaluated visually.

○: No influence on image after printing.
Δ: Some irregularity of image is observed after printing, but no practical problem.
×: Excellent image is not obtained after printing.

TABLE 3

| | Example | | | | | | | | | |
|---|---|---|---|---|---|---|---|---|---|---|
| | 1 | 2 | 2 | 4 | 5 | 6 | 7 | 8 | 9 | 10 |
| Production Example 1 | 30 | 30 | — | — | — | 70 | — | — | — | — |
| Production Example 2 | — | — | 30 | — | — | — | — | — | — | — |
| Production Example 3 | 70 | — | — | — | — | 30 | — | — | — | — |
| Production Example 4 | — | 70 | 70 | 50 | 50 | — | 70 | — | — | — |
| Production Example 5 | — | — | — | 50 | — | — | — | — | — | — |
| Production Example 6 | — | — | — | — | 50 | — | — | — | — | — |
| Production Example 7 | — | — | — | — | — | — | 30 | 50 | — | — |
| Production Example 8 | — | — | — | — | — | — | — | 50 | — | — |
| Production Example 9 | — | — | — | — | — | — | — | — | 100 | — |
| Production Example 10 | — | — | — | — | — | — | — | — | — | 100 |
| Temperature region (° C.) at which inflection point is observed | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher | 1 point at 15° C. or lower, 1 point at 70° C. or higher |
| Colloidal silica | 120 | 120 | 45 | 120 | 120 | 230 | 120 | 120 | 120 | 100 |
| White paper gloss (measured value) | ○ (61) | ○ (60) | ◎ (70) | Δ (58) | Δ (59) | ◎ (65) | ○ (61) | ○ (64) | ○ (64) | ○ (61) |
| Printing ability | ◎ | ◎ | Δ | ○ | ○ | ◎ | Δ | ◎ | ◎ | ◎ |
| Bending resistance | Δ | Δ | ○ | ○ | ○ | ○ | ○ | ○ | ○ | ○ |
| Bending resistant printing ability | Δ | Δ | Δ | ○ | ○ | ○ | ○ | ○ | ○ | ○ |

Δ: 55 or more and less than 60.
×: 55 or less.

Printing ability: Ink jet printing (ISO/JIS-SCID JIS X9201-1995: N5) was conducted using an ink jet printer PM-770 manufactured by Seiko Epson Corporation, and its printing ability was evaluated visually. The standards of evaluation were as follows:

Comparative Example 1

The synthetic resin emulsion obtained in Production Example 1 in an amount of 100 parts by weight in terms of non-volatile components, and colloidal silica in an amount of 120 parts by weight in terms of non-volatile components were combined, and a coating composition containing 38% by weight of non-volatile components was prepared after further incorporating 5 parts by weight of a thickening agent and 2 parts by weight of polyethylene wax as a releasing agent.

This coating composition was applied in the same manner as in Example 1, to obtain an ink jet recording paper. In this case, the cast coated amount was 10 g/$m^2$ based on terms of non-volatile components.

Comparative Examples 2 to 5

The same procedure as in Comparative Example 1 was repeated except that the kind and amount of the synthetic resin emulsions and the amount of colloidal silica were changed as shown in Table 4.

present in amounts of from 0.3 to 10% by weight, based on total monomers used in the emulsion composition.

2. The coating composition for an ink jet recording medium according to claim 1, wherein at least one of the glass transition points of the synthetic resin emulsion is 30° C. or lower and at least one of the other glass transition points is over 30° C.

3. The coating composition for an ink jet recording medium according to claim 1, wherein at least one of the first and second polymeric portions comprise, in addition to the silyl containing monomer,

TABLE 4

| | Comparative Example | | | | |
|---|---|---|---|---|---|
| | 1 | 2 | 3 | 4 | 5 |
| Production Example 1 | 100 | — | — | — | — |
| Production Example 3 | — | 100 | — | — | — |
| Comparative Production Example 1 | — | — | 50 | — | — |
| Comparative Production Example 2 | — | — | — | 50 | — |
| Comparative Production Example 3 | — | — | — | — | 50 |
| Comparative Production Example 4 | — | — | 50 | — | — |
| Comparative Production Example 5 | — | — | — | 50 | — |
| Comparative Production Example 6 | — | — | — | — | 50 |
| Temperature region (° C.) at which inflection point is observed | 1 point at 15° C. or lower | 1 point at 70°C. or higher | 1 point at 15° C. or lower and 1 point at 70° C. or higher | 1 point at 15° C. or lower and 1 point at 70° C. or higher | 1 point at 15° C. or lower and 1 point at 70° C. or higher |
| Colloidal silica | 120 | 120 | 120 | 120 | 120 |
| White paper gloss (measured value) | ◎(80) | X(51) | O(62) | ○(63) | ○(61) |
| Printing ability | X | ◎ | Δ | X | Δ |
| Bending resistance | ○ | X | X | Δ | X |
| Bending resistant printing ability | X | X | X | Δ | X |

The invention claimed:

1. A coating composition for an ink jet recording medium comprising:

i) colloidal silica; and ii) a synthetic resin emulsion composition having two or more glass transition (Tg) points, wherein said emulsion composition includes a) a first polymeric portion which includes the residues of a radical-polymerizable unsaturated monomer having a silyl group, and another radical polymerizable unsaturated monomer; and b) a second polymeric portion which also includes the residues of a radical polymerizable unsaturated monomer having a silyl group, and another radical polymerizable unsaturated monomer, wherein the first polymeric portion is constituted to provide the emulsion composition with a first Tg point, and the second polymeric portion is constituted to provide the emulsion composition with a second Tg point which is dissimilar from the first Tg point, and wherein the first polymeric portion and second polymeric portion are separately emulsion polymerized in the presence of at least one radical polymerizable surfactant, such that the radical polymerizable surfactant is i) at least one monomer selected from alkyl (meth) acrylates, cycloalkyl (meth) acrylates, styrene and vinyl esters of branched carboxylic acids, and ii) a functional monomer including at least one monomer selected from ethylenically unsaturated carboxylic acids.

4. The coating composition for an ink jet recording medium according to claim 1, wherein the radical polymerizable unsaturated monomer(s) having a silyl group in the first and second polymeric portions are present in amounts of from 0.1 to 15 parts by weight, based on total radical polymerizable unsaturated monomers used in the emulsion composition.

5. The coating composition for an ink jet recording medium according to claim 1, wherein a compounding ratio of the synthetic resin emulsion to colloidal silica is from 10:90 to 90:10 based on non-volatile components.

6. The coating composition for an ink jet recording medium according to claim 1, wherein the radical polymerizable unsaturated monomer(s) having a silyl group in the first and second polymeric portions are present in amounts of from 0.5 to 10 parts by weight based on total radical polymerizable unsaturated monomers used in the emulsion composition.

7. The coating composition for an ink jet recording medium according to claim 1, wherein the radical polymerizable surfactant is present in amounts of from 0.5 to 5.0% by weight based on total monomers used in the emulsion composition.

8. The coating composition for an ink jet recording medium of claim 1, wherein at least one of the glass transition points of the synthetic resin emulsion is 15° C. or less, and at least one of the glass transition points is 70° C. or higher.

9. The coating composition for an ink jet recording medium of claim 1, wherein at least one of the glass transition points of the synthetic resin emulsion is in the range of from −30° C. to 30° C. and at least one of the glass transition points is in the range of from 50° C. to 90° C.

10. The coating composition for an ink jet recording medium according to claim 1, wherein the compounding ratio of the synthetic resin emulsion to colloidal silica is from 30:70 to 70:30 based on non-volatile components.

11. The coating composition for an ink jet recording medium of claim 1, wherein the first polymeric portion comprises alkyl (meth) acrylate monomers, and the second polymeric portion comprises styrene monomers.

12. The coating composition of claim 11, wherein the second polymeric portion comprises a styrene-acrylate copolymer.

13. The coating composition according to claim 11, wherein said first polymeric portion comprises a butyl (meth)acrylate-methyl (meth)acrylate copolymer.

14. The coating composition of claim 11, wherein the first polymeric portion provides a glass transition point of less than 15° C. and the second polymeric portion provides a glass transition point of greater than 70° C.

15. The coating composition according to claim 1, wherein the first and second polymeric portions are non-ionic.

* * * * *

UNITED STATES PATENT AND TRADEMARK OFFICE

CERTIFICATE OF CORRECTION

PATENT NO. : 7,144,944 B2

APPLICATION NO. : 10/471929

DATED : December 5, 2006

INVENTOR(S) : N. Murase et al.

It is certified that error appears in the above-identified patent and that said Letters Patent is hereby corrected as shown below:

On the Title page of the patent, at Item (73), please change the Assignee from "Gelanese International Corporation" to --Celanese International Corporation--.

Signed and Sealed this

Tenth Day of April, 2007

JON W. DUDAS

*Director of the United States Patent and Trademark Office*